United States Patent [19]
Canella

[11] 3,831,735
[45] Aug. 27, 1974

[54] BULK MATERIAL BLENDING AND RECLAIMING APPARATUS

[75] Inventor: Luigi Canella, Genova, Italy

[73] Assignee: Italimpianti Societa Italiana Impianti p.a., Genova, Italy

[22] Filed: Feb. 28, 1973

[21] Appl. No.: 336,525

[30] Foreign Application Priority Data
Mar. 4, 1972 Italy.................................. 12515/72

[52] U.S. Cl.................................... 198/36, 214/10
[51] Int. Cl............................................ B65g 59/02
[58] Field of Search............ 214/10; 198/9, 36, 142, 198/211, 140

[56] References Cited
FOREIGN PATENTS OR APPLICATIONS
| | | | |
|---|---|---|---|
| 1,116,428 | 6/1968 | Great Britain........................ | 37/190 |
| 1,557,368 | 1/1969 | France................................ | 214/10 |
| 1,161,215 | 1/1964 | Germany.............................. | 37/190 |
| 944,673 | 12/1963 | Great Britain........................ | 214/10 |
| 863,671 | 3/1961 | Great Britain....................... | 37/190 B |

*Primary Examiner*—Frank E. Werner
*Attorney, Agent, or Firm*—Larson, Taylor and Hinds

[57] ABSTRACT

A reclaiming apparatus comprising a rotatable drum formed by a cage-like frame structure, the said drum being movable relative to a storage pile of particulate raw material. A number of buckets are secured to the cage-like drum. The buckets are disposed in parallel rows extending along the whole length of the drum, the said rows being equiangularly spaced along the drum periphery. Conveyor means are provided inside of the drum for conveying outside of the drum the particulate material discharged into the drum by the said buckets during the operation of the reclaiming apparatus.

3 Claims, 4 Drawing Figures

BULK MATERIAL BLENDING AND RECLAIMING APPARATUS

BACKGROUND OF THE INVENTION

This invention relates to material handling apparatus and, more particularly, to apparatus for blending, reclaiming, handling and conveying particulate material such as mineral ores, sand, coal, gravel, etc. from a material storage pile.

In many industrial operations, it is necessary to store relatively large quantities of particulate material in large piles or stacks for subsequent use. The removal of the particulate material from such stacks or piles is commonly referred to as reclaiming. Many different types of reclaiming devices have heretofore been employed for removing the particulate material from storage piles. One form of particulate material handling apparatus widely used in reclaiming operations employs a digging wheel having buckets spaced around the wheel periphery to pick up material from the storage pile and depositing it on conveying means. The digging wheel is rotatably and axially slidably mounted on a frame which in turn is provided with mobile supporting means so as to enable the entire wheel to be moved relative to the storage pile.

Another form of particulate material handling device used in reclaiming operations employs a tube-type cylinder provided with openings in correspondence of which the buckets are fastened to the said cylinder. The said tube type cylinder is rotatably supported by mobile supporting means, so as to enable the entire cylinder to be moved relative to the storage pile whilst rotating around its longitudinal axis.

In all the said reclaiming devices, the material picked up by the buckets is lifted up to a high enough level and thereafter dropped from the buckets onto conveying means supported by a structure extending in an axial direction inside of the bucket wheel or the bucket tube.

Such heretofore known prior art reclaiming devices have been beset with many disadvantages. For example, the bucket wheel type reclaiming apparatuses are slow in operation, since the bucket wheel, due to its limited width, has to be continuously moved across the exposed storgage pile face.

The above disadvantages are partially obviated by the tube-type reclaiming apparatuses, which have however the great disadvantage that inside of the tube an enormous amount of dust is suspended during the operation of the apparatus, making impossible an inspection of the inside of the tube during its operation.

Moreover, the above known prior art devices must be provided with a fixed shield plate disposed beneath the buckets and extending at least from the picking-up level up to the discharging level, in order to ensure that the picked up material is discharged onto the above mentioned conveying means.

SUMMARY OF THE INVENTION

According to the invention, a reclaiming apparatus is provided comprising a rotatable drum formed by a cage-like structure, which is rotatably supported by a mobile bridge frame, so as to enable the entire drum to be moved relative to the storage pile. A number of buckets are secured to the cage-like structure of the drum, the said buckets being disposed in parallel rows extending across the whole length of the drum, and equiangularly spaced around the drum periphery. Conveyor means are provided inside of said drum for conveying outside of the drum the particulate material discharged into the drum by the said buckets during the operation of the reclaiming apparatus.

According to another feature of the invention, the said mobile bridge frame comprises a main girder, supported at its ends by two legs, which are hingedly connected to the main girder, the said legs being in turn supported at their lower ends by travel bogies. The cage like drum is rotatably supported by said bridge frame at one end through a roller bearing suspended to the main girder, whilst at the opposite end it is supported by one of the legs of the bridge frame, with the interposition of a suitable bearing. Power means are provided for rotating the said cage like drum around its longitudinal axis.

According to a still further feature of the invention the buckets fastened to the cage like drum are each provided with a showel-like fore section projecting outwardly from the drum periphery, two side plates and a bottom plate, the said bottom plate being angularly adjustable with respect to the side plates and to the fore end of the bucket.

These and further objects and advantages of the invention will be evident from the following disclosure which discusses the essential characteristics of the reclaiming apparatus according to the invention.

DESCRIPTION OF THE PREFERRED EMBODIMENT OF THE INVENTION

Figure 1:
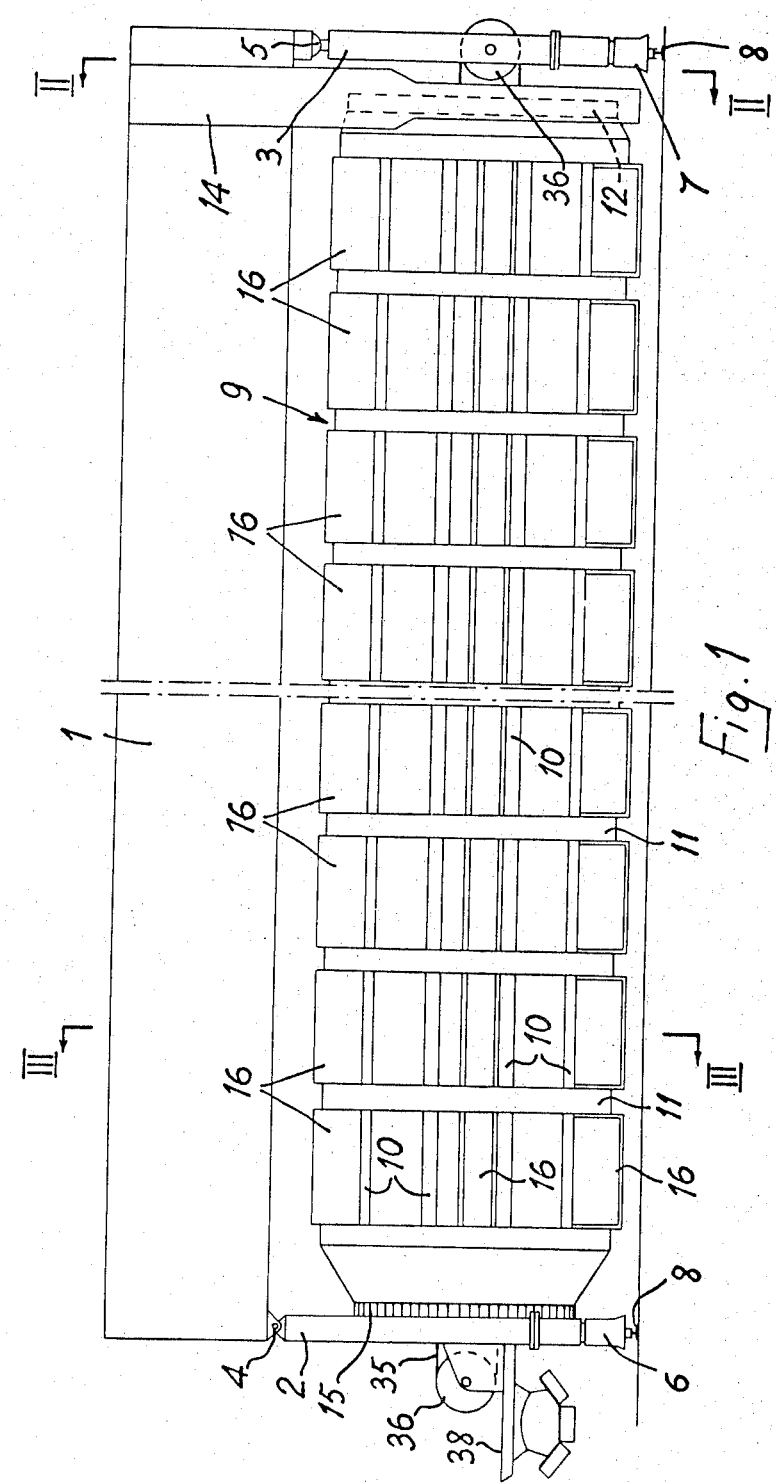
FIG. 1 is a side view of a reclaiming apparatus according to the invention.
Figure 2:
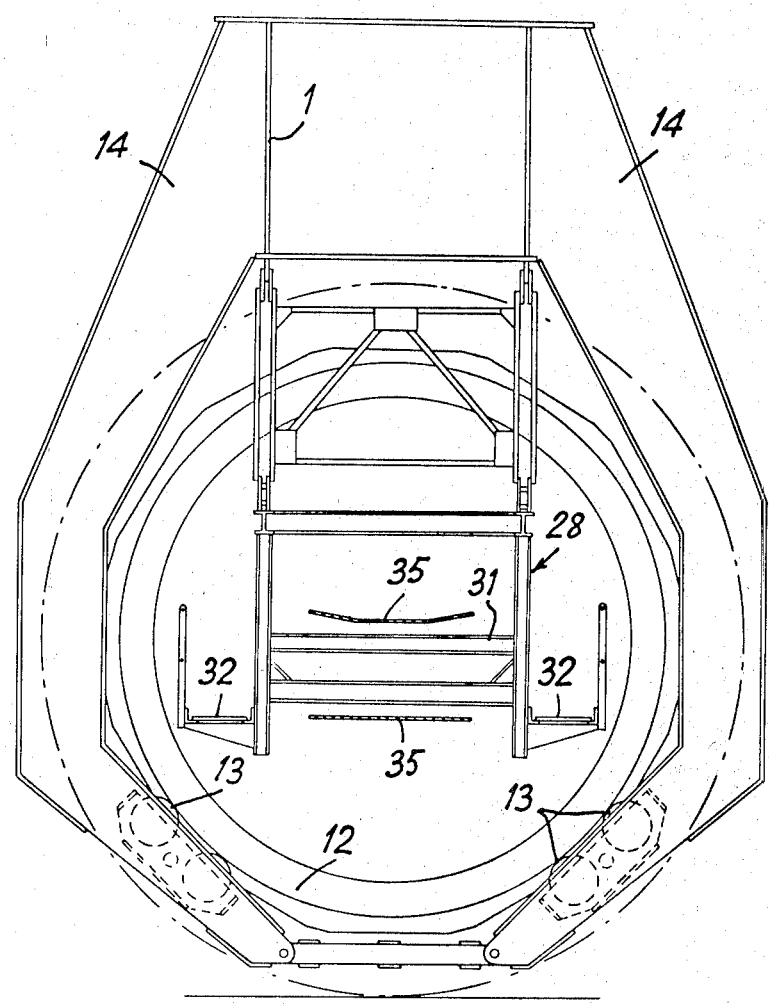
FIG. 2 is a cross sectional view of the apparatus of FIG. 1, taken along the plane of line II—II of FIG. 1.
Figure 3:
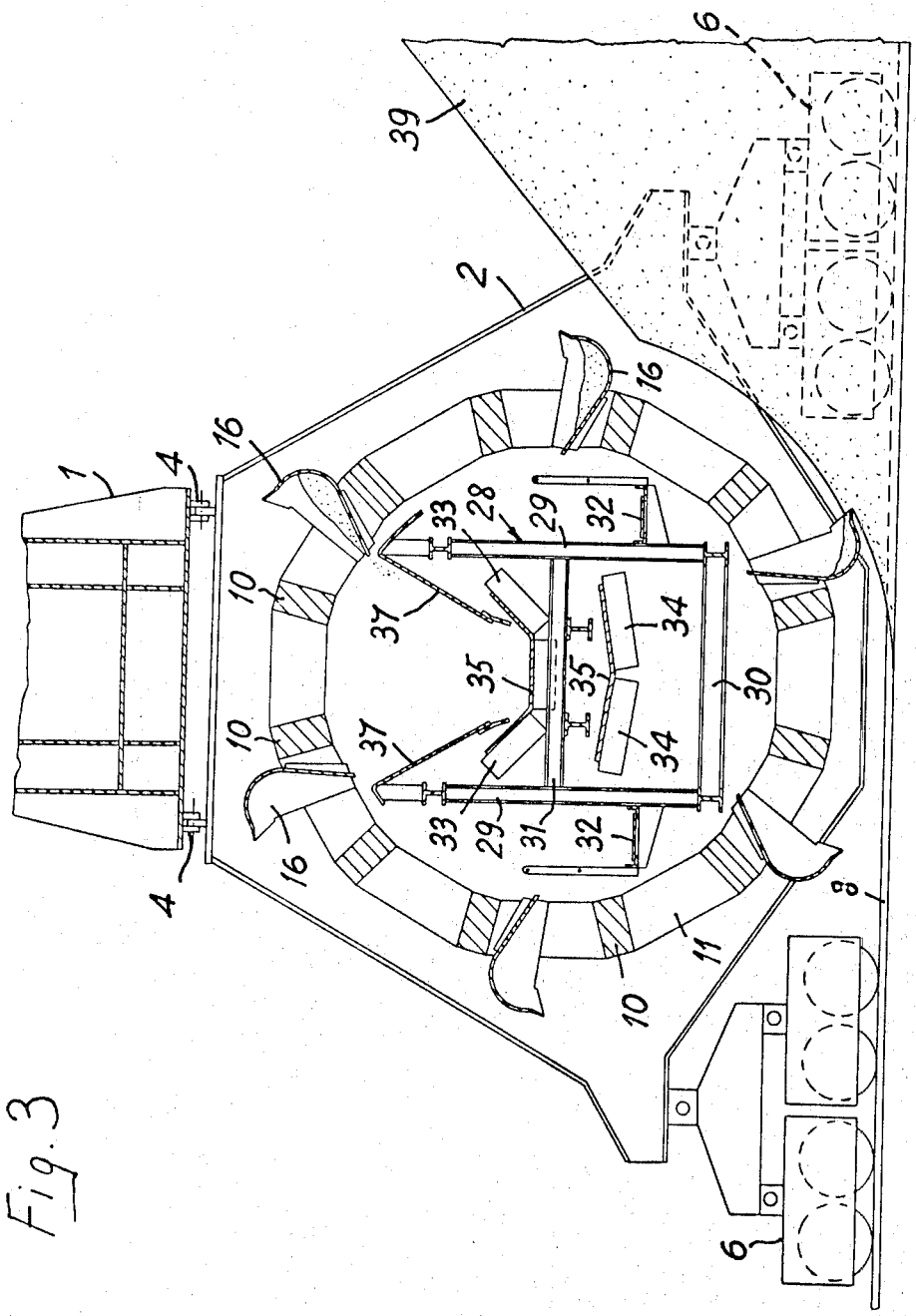
FIG. 3 is a cross sectional view of the apparatus FIG. 1, taken along the plane of line III—III of FIG. 1.

With reference to the drawings, the reclaiming apparatus shown comprises a mobile bridge structure comprising a main girder 1, supported at its ends by two legs 2 and 3. The main girder 1 is connected to leg 2 by means of hinges 4, and to leg 3 by means of hinges 5. The legs 2 and 3 are supported at their lower ends by travel bogies, which are in turn supported by the rails 8, from movement to and fro the storage pile 39. Reference numeral 9 denotes the cage like buckets drum, which is rotatably supported by the said mobile bridge structure.

The said drum 9 is composed by a number of longitudinal beams 10 equiangularly spaced around the periphery of the drum, connected together by the annular interconnecting members 11. At one end the drum 9 is provided with a cylindrical bearing surface 12, which bears on rollers 13 journalled in the lower end of an annular supporting structure 14 encircling the said end of the drum 9, and suspended to the main girder 1.

The opposite end of the drum 9 is rotatably supported by the leg 2, the said end being provided with a toothed annular portion 15 in mesh with, and supported by at least two pinions (not shown) operated by a suitable motor for rotation of the drum 9 around its longitudinal axis. To drum 9 the buckets 16 are secured.

Figure 4:
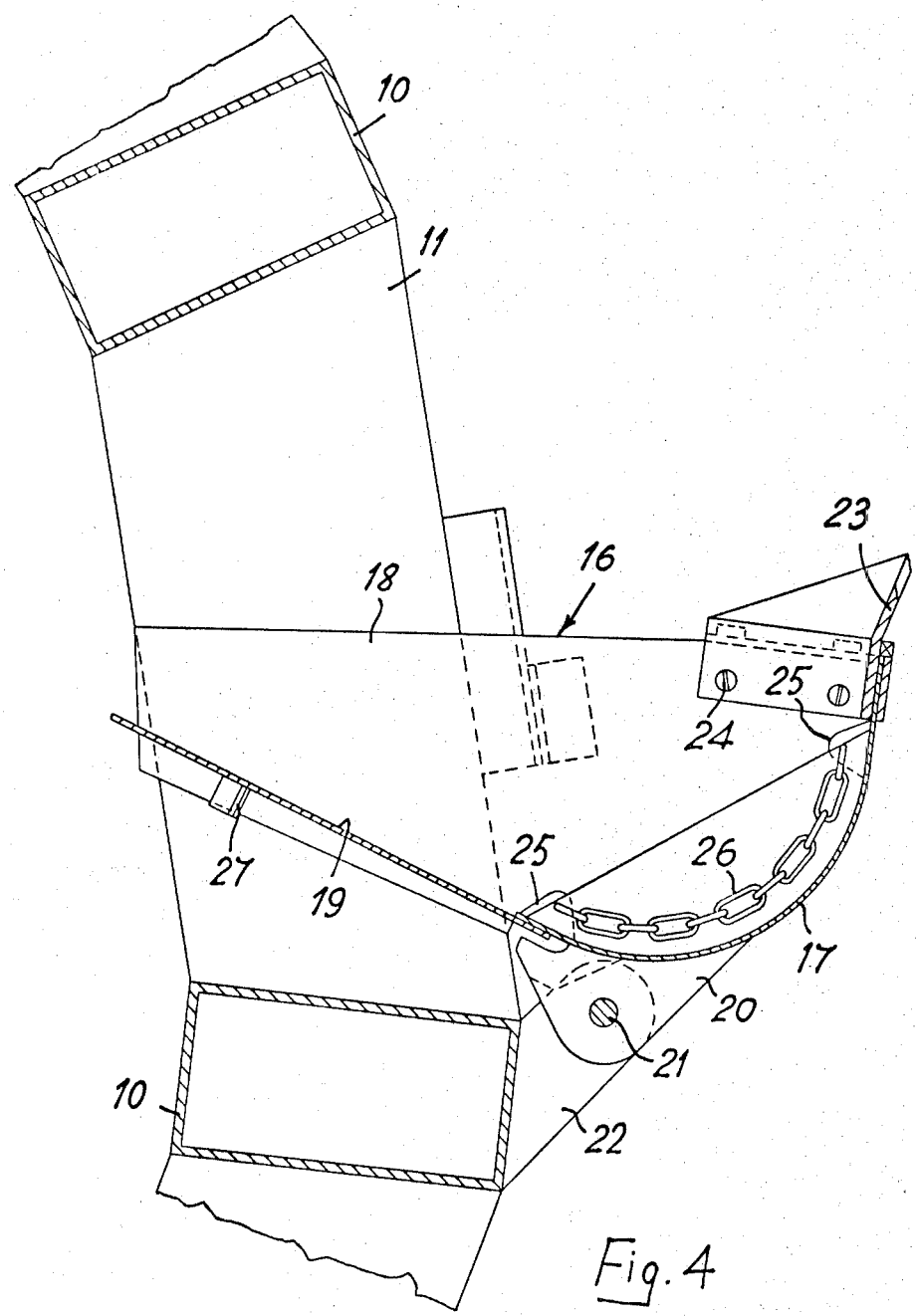
FIG. 4 is a longitudinal sectional view of the particular of one bucket of the apparatus of FIG. 1, with the adjacent parts of the drum of the said apparatus.

The said buckets, as best shown in FIG. 4, comprises a fore shovel-like section 17, two side walls 18 and a bottom wall 19. The fore section is provided at its lower side with ears 20 having a central bore for the passage of a fastening bolt 21 for fastening of the bucket 16 to the ears 22 secured to the beams 10 of the drum structure. The working edge of the bucket 16 is provided with a digging piece 23, secured to the bucket by means of bolts 24. Inside of the shovel 17, two ears 25 are welded to which the ends of a chain segment 26 are secured. The bottom 19 is secured by one edge to the adjoining edge of the shovel 17, and may be angularly adjusted with respect to the shovel 17 and the walls 18 by bending it more or less. The bottom 19 is supported in its adjusted position by the distance pieces 27 secured to the side walls 18, and against which the bottom 19 abuts. Each bucket 16 is fastened to the drum 9 in correspondence of one box formed in the cage structure of said drum between the beams 10 and the peripheral elements 11, in such a manner that the shovel 17 projects outwardly from the drum 9.

Inside of drum 9, a suitable framework 28 is housed. The said framework is secured to the legs 2 and 3. The said framework 28 comprises two side frames 29, a bottom platform 30, an upper platform 31, and two side corridors 32 for inspection men. On the upper platform 31 a number of roller pairs 33 are rotatably supported, with their axis disposed so as to converge toward the center of the platform 31. On the lower platform 30, a number of roller pairs 34 are rotatably supported. On the rollers 33 the upper run of an endless belt conveyor 35 is supported, whilst the rollers 34 are supporting the lower run of the said conveyor 35, 36 are the end transmission rolls for conveyor belt 35.

A hopper 37, disposed above the upper run of conveyor 35, is supported by the framework 28.

OPERATION OF THE DESCRIBED APPARATUS

The operation of the described apparatus is evident. With the conveyor belt 35 into operation, the drum 9 is rotated and simultaneously the mobile bridge structure 1, 2, 3 is advanced toward the storage pile 39. The material collected by the buckets 16 is lifted up to the level of the hopper 37, at which level the material begins to be discharged from the buckets onto the hopper 37 and the underlying upper run of the conveyor 35. The said discharging operation is completed within the arch sector defined by the hopper walls 37. It will be noted that the said arch sector is substantially equal to the angular spacing of two subsequent buckets 16. The discharging of the material from the buckets 16 is facilitated by the presence of the chain segment 26. The bottom plate 19 of the single buckets is adjusted at such an angle with respect to the front portion 17 of the buckets as to prevent the material collected into the buckets to be discharged from the buckets at a point prior to the hopper 37. The angle of adjustment of the said bottom plate 19 is thus dependent from the characteristics of the material being handled.

The material discharged onto the conveyor 35 is thereafter discharged out of the apparatus onto a suitable conveyor 38.

Because the drum 9 is formed by an open cage-like frame, the dust may not collect inside of the drum itself, making more easy any inspection in the drum even during the operation of the apparatus.

What I claim is:

1. A reclaiming apparatus comprising a bridge frame structure formed by a main girder supported at its ends by two legs hingedly connected to said main girder, the said legs being mounted on travel bogies; a first roller bearing support suspended from the main girder; a second bearing formed in one of the said legs, the said two bearings being aligned; a cylindrical cage like drum rotatably supported by the said bearings, the said drum comprising a number of longitudinal beams connected together by annular interconnecting members which form with said beams open boxes in the cage like drum; driving means in said bridge structure for rotating said cage like drum around its longitudinal axis; a number of buckets secured to said drum in correspondence with said open boxes formed in the drum structure between the beams and the annular interconnecting members, conveyor means inside the said drum for conveying outside of the drum the particulate material discharged into the drum by said buckets, a hopper disposed inside of said drum above said conveyor for conveying the material discharged by said buckets onto said conveyor, and at least one side corridor inside of said drum disposed beside said conveyor and extending parallel thereto.

2. A reclaiming apparatus according to claim 1, in which the said buckets are each provided with a fore shovel like end, two side walls and a bottom wall, the said bottom wall being angularly adjustable with respect to the fore end of the bukcet, so as to vary the inclination of the discharging plane from the bucket.

3. A reclaiming apparatus according to claim 2, including means in said bucket for facilitating the discharge of the material from the buckets, the said means being in the form of a chain length.

* * * * *